Nov. 26, 1963  S. KAPLAN  3,111,713
EXTRUSION CROSS-HEAD FOR PLASTIC MATERIAL
Filed Jan. 24, 1961
FIG. 2
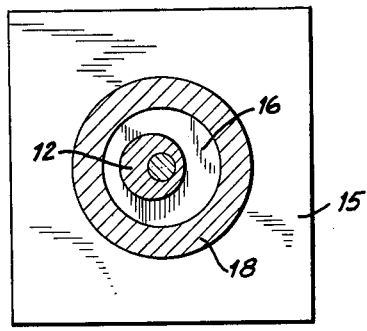
FIG. 3
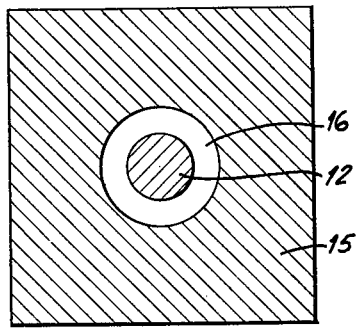
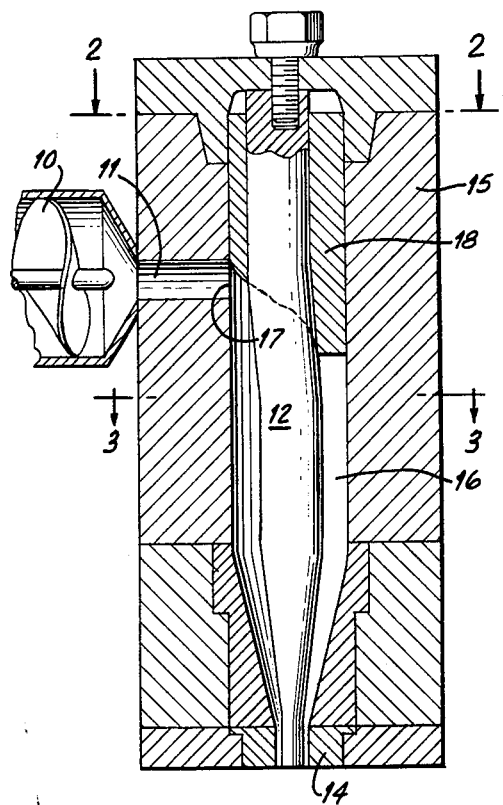
FIG. 1
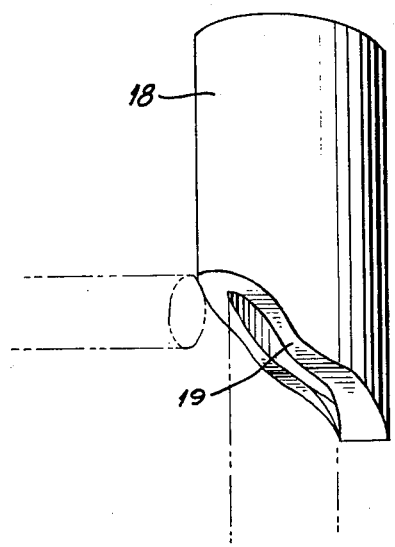
FIG. 4
INVENTOR.
SEYMOUR KAPLAN
BY
Kleinberg & Lilling
ATTORNEYS United States Patent Office 3,111,713
Patented Nov. 26, 1963

3,111,713
EXTRUSION CROSS-HEAD FOR PLASTIC MATERIAL
Seymour Kaplan, Box 337, Mohegan Lake, N.Y.
Filed Jan. 24, 1961, Ser. No. 84,597
9 Claims. (Cl. 18—14)

This invention is broadly in the field of the extrusion art; more specifically it presents a plastic extrusion head; and in detail, it is concerned with an improved extrusion cross-head.

It is commonly necessary in the plastic forming art to utilize a cross-head to direct heated and workable plastic around a right angle bend while simultaneously forming the plastic into a tube. One example of such use is in the field of blow-molding. It is preferable in that art, to direct the extrudate from a substantially horizontal extruder downward in a tubular shape. The tube is then urged through a finishing die to form a length of hollow tubing ready for blowing to the finished shape. Similarly, in the wire forming art, a hollow tube of the plastic material may be extruded downward around wire or cable thereby forming a coating or sheathing around the cable. A similar process may be utilized for producing blown film.

This turning and forming of the workable plastic is an extremely critical operation. It is important that the tube thus formed be exactly symmetrical in all respects and especially uniform as to dimensions, pressure and temperature. These criteria are especially important with some of the newer plastic materials that have a memory i.e. they will tend to return somewhat to their original shape and form while still warm, if subjected to sudden changes and/or uneven temperatures or pressures. It is also important that plastic material, no matter what its flow path may be, is not allowed to stagnate.

There are many conventional cross-heads known and used in the prior art. They all, however, have several shortcomings; the primary one being instability and unevenness of form of the extruded tube. This is due in part to the failure of the prior art to recognize the fact that heated plastic in a semi-fluid state will tend to flow along the path of least resistance.

It is a cardinal object of this invention, therefore, to provide a cross-head that will produce a more uniform tube of extruded material.

It is another primary object hereof to set forth apparatus that will cause heated plastic to flow about substantially a right angle and then to flow around a core, forming a tube and finally through a tube finishing die.

Still another object of the instant device is to provide a cross-head that will not allow stagnation or turbulence of the plastic material.

A further object hereof is to set forth a method of flow in the crosshead that is efficient and uniform.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is a sectional elevation view taken substantially through the center of the new and improved cross-head.

FIG. 2 is a sectional view taken substantially along line 2—2 of FIG. 1 and illustrating the position of the central mandrel and core sleeve.

FIG. 3 is a sectional view taken substantially along line 3—3 of FIG. 1 illustrating the symmetrical position of the mandrel at that section.

FIG. 4 is a view in perspective of the core sleeve illustrating in detail its lower spiraloidal surface.

In FIG. 1 there is illustrated generally a cross-head plastic apparatus to be positioned in any suitable manner at the output of the extruder 10. It should be noted that the details of the extruder 10 or of the remainder of the plastifying apparatus are not shown or described in detail since it forms no part of the present invention. In fact, the extruder 10 may be replaced by any conventional plastifying medium.

Sufficient to say, however, that the heated semi-fluid plastic material under pressure is fed into the cross-head assembly through a laterally opening bore 11. As will be later described hereinafter in detail, the plastic material passes through bore 11, is guided downwardly through longitudinal opening 16, around a center mandrel 12 and is finally urged out downwardly through a die 14.

It is common in the prior art to locate the mandrel 12 symmetrically with respect to the cross-head housing 15 and longitudinal opening 16. This structure and arrangement has several defects, some of which are readily apparent. Since the material enters the longitudinally extending opening 16 in the housing 15 to one side of the mandrel 12, the plastic material will naturally flow along the path of least resistance which is, of course, the path downward in vertical alignment with bore 11. This results in uneven pressure distribution and flow characteristics at different locations about the circumference of the mandrel. As was hereinabove explained, it is essential that the extrusion be uniform in all respects; a result obviously not obtainable with the symmetrical structure and annular arrangement described immediately above.

This invention, however, contemplates the use of a mandrel 12 that is not symmetrical at all points relative to the longitudinally extending opening 16.

As is illustrated most clearly in FIG. 1 and in FIG. 2, the mandrel 12 is offset so as to be relatively close to the opening 17 to bore 11 at the section of that opening. This structure results in an increased resistance flow path for the downward flow of material in the area of opening 17 and a decreased resistance flow path at the portion of the mandrel opposite opening 17. This phenomenon is utilized to equalize the pressures around the mandrel thereby producing a more uniform tube of plastic material in an efficient manner. Furthermore, this insures that the finished tube, when extruded through die 14 will have a completely regular wall thickness.

The amount of offset or displacement of the portion of mandrel 12 in the area of bore 11 necessary to equalize the flow of the material may be calculated analytically but will more frequently be determined by experimentation. Once the pressures of the material surrounding mandrel 12 are equalized, it will generally be necessary to centrally locate the mandrel with respect to the walls of the longitudinally extending opening 16 in cross-head housing 15. This may be accomplished either by offsetting the walls of the opening 16 relative to the mandrel 12 below bore 11, or as herein illustrated, by bending the mandrel with respect to the walls of opening 16 below bore 11.

To recapitulate then, the heated plastic material is urged through bore 11 and downward and around mandrel 12. The pressures are equalized by offsetting mandrel 12 in relation to the longitudinally extending opening 16 in the cross-head housing 15. The material is prevented from rising upward by a sleeve 18 having a smooth lower plastic guiding surface 19.

It will be apparent that the plastic material surrounding mandrel 12 and within opening 16, should either be necked down gradually or expanded gradually to the wall thickness and diameter of the tube to be extruded. As illustrated in FIG. 1, wherein a necking down is disclosed, a uniform tapering section 20 is positioned to co-act with a uniform tapering portion 21 of mandrel 12. It has been found desirable to neck the tube very gradually and evenly so that the distance between the mandrel 12 and the longitudinally extending opening 16 at each section is less than that of any section closer to bore 11. This gradual necking of the material may be especially important when utilizing a plastic material having a "memory" characteristic.

As hereinbefore mentioned, it is especially important that the plastic material not be allowed to stagnate at any portion of its flow path. Since the cross-head is usually heated, or heat insulated, the material may change characteristics and may even partially decompose. It is common in the prior art, to have a degree of turbulence and stagnation in the area of the right angle bend, or more specifically, at the intersection of lateral bore 11 and longitudinally extending opening 16. A core sleeve 18 is usually provided either around or integral with mandrel 12 to direct the material downward. The lower or plastic guiding surface 19 of core sleeve 18 is usually in the form of an inclined plane, or an inclined plane in combination with some transition curve at its lower portion.

In the embodiment of the invention illustrated, there is demonstrated an efficient and improved lower curved surface 19.

It has been shown that a most efficient curve for use in transition members for a right angle bend, is a right spiraloid. Prior attempts at utilizing this curve in similar problems has been limited to a right spiraloid over the lower half of surface 19 intersecting with a plane surface at the upper half connecting with the lateral bore 11. It will be apparent, however, that the intersection of a plane with a substantially circular bore must produce stagnation or dead spots. For example, if the plane intersects the bore 11 at its top, each corner of the plane and a small portion below will be blocked, and if each of the corners of the plane are positioned to intersect the bore, a portion of the bore will be blocked by the center of the plane.

To overcome these obstacles and to realize a more efficient material passage, this invention contemplates an extension of the upper half of the bore 11 into the core sleeve 18 intersecting with a right spiraloid comprising the remainder of its lower surface 19. This result is illustrated in detail in FIG. 4 which is an enlarged view of the core sleeve 18 with the extension of the lateral bore 11 shown in phantom. As above explained, a lower transition surface 19 as therein shown, may be produced by first cutting a double right spiraloid, identical on either side, and then cutting laterally from one side with a cutter of the same radius as that of bore 11.

The above should suffice to impart a clear understanding of the primary features of the invention. The cross-head provided produces a completely uniform and even tube of plastic material as to dimensions, temperature, pressure and in all other respects.

While there are above disclosed but a limited number of embodiments of the structure and product of the invention herein presented, it is possible to produce still other embodiments without departing from the inventive concept herein disclosed, and it is desired therefore that only such limitations be opposed on the appended claims as are stated therein, or required by the prior art.

Having thus described my invention and illustrated its use, what I claim as new and desired to secure by Letters Patent is:

1. A cross-head for fabricating tubing from plastic material in workable condition, comprising:
   (a) a lateral bore to receive said plastic material,
   (b) a longitudinal bore to discharge said plastic material from said cross-head,
   (c) said lateral bore and said longitudinal bore being in communication and at an angle to each other,
   (d) and a mandrel within said longitudinal bore to form said plastic material into a tubular shape,
   (e) the portion of said mandrel in proximity with said lateral bore being offset whereby said portion will be closer to said bore.

2. A cross-head for fabricating tubing from plastic material in workable condition as set forth in claim 1, further including a centrally located concentric annular die at the discharge area of said longitudinal bore to finish the forming of said tube.

3. A cross-head for fabricating tubing from plastic material in workable condition as set forth in claim 2 wherein the portion of said mandrel closest said centrally located die is concentric within said longitudinal bore.

4. A cross-head for fabricating tubing from plastic material in workable condition as set forth in claim 3 wherein the axis of said lateral bore and the axis of said longitudinal bore are at right angles.

5. A cross-head for fabricating tubing from plastic material in workable condition as set forth in claim 3 wherein the major portion of said mandrel within said longitudinal bore is concentric within said longitudinal bore.

6. A cross-head for fabricating tubing from plastic material in workable condition as set forth in claim 5 further including a core sleeve within said longitudinal bore whereby a smooth transition curve for said plastic material from said lateral bore to said longitudinal bore will be provided.

7. A cross-head for fabricating tubing from plastic material in workable condition as set forth in claim 6, wherein the portion of said transition curve closest said lateral bore will be the intersection of an extension from said lateral bore and a plane surface.

8. A cross-head for fabricating tubing from plastic material in workable condition as set forth in claim 7, wherein the remainder of said transition curve will be a right spiraloid.

9. A cross-head for fabricating tubing from plastic material in workable condition, comprising:
   (a) a lateral bore to receive said plastic material,
   (b) a longitudinal bore to discharge said plastic material from said cross-head,
   (c) said lateral bore and said longitudinal bore being in communication and at a right angle to each other,
   (d) and a mandrel within said longitudinal bore to form said plastic material into a tubular shape,
   (e) a core sleeve within said longitudinal bore whereby a smooth transition curve for said plastic material from said lateral bore to said longitudinal bore will be provided,
   (f) the portion of said mandrel in proximity with said core sleeve being offset whereby said portion will be closer to said lateral bore.

References Cited in the file of this patent

UNITED STATES PATENTS

| | | |
|---|---|---|
| 2,633,602 | Sverdrup | Apr. 7, 1953 |
| 2,834,054 | Maddock et al. | May 13, 1958 |
| 2,865,050 | Strauss | Dec. 23, 1958 |
| 2,987,766 | Porter | June 13, 1961 |

FOREIGN PATENTS

| | | |
|---|---|---|
| 516,615 | Italy | Feb. 23, 1955 |